(12) United States Patent
Roskam et al.

(10) Patent No.: US 8,486,471 B2
(45) Date of Patent: *Jul. 16, 2013

(54) SNACK/CONVENIENCE FOODS AND THE LIKE HAVING EXTERNAL AND/OR INTERNAL COATING COMPOSITIONS

(75) Inventors: Robert O. Roskam, Grand Rapids, MI (US); Cheree L. Stevens, Idaho Falls, ID (US); John F. Stevens, Idaho Falls, ID (US); Joel R. Tinsley, Blackfoot, ID (US)

(73) Assignee: Advanced Food Technologies Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,316

(22) Filed: Feb. 7, 2011

(65) Prior Publication Data
US 2011/0129571 A1    Jun. 2, 2011

Related U.S. Application Data

(63) Continuation of application No. 11/933,091, filed on Oct. 31, 2007, now Pat. No. 7,906,164, which is a continuation of application No. 10/170,964, filed on Jun. 13, 2002, now Pat. No. 7,294,355.

(60) Provisional application No. 60/305,005, filed on Jul. 12, 2001, provisional application No. 60/334,646, filed on Nov. 30, 2001.

(51) Int. Cl.
*A23B 9/14* (2006.01)

(52) U.S. Cl.
USPC ............. 426/302; 426/94; 426/289; 426/293; 426/305

(58) Field of Classification Search
USPC ............................ 426/302, 94, 289, 293, 305
See application file for complete search history.

(56) References Cited

U.S. PATENT DOCUMENTS

| | | | |
|---|---|---|---|
| 3,424,591 A | 1/1969 | Gold | |
| 3,597,227 A | 8/1971 | Murray et al. | |
| 3,630,755 A | 12/1971 | Schiffman | |
| 3,723,132 A | 3/1973 | Hodge et al. | |
| 3,751,268 A | 8/1973 | Van Patten et al. | |
| 4,053,650 A | 10/1977 | Chino et al. | |
| 4,066,796 A | 1/1978 | McKee | |
| 4,109,024 A | 8/1978 | Cremer | |
| 4,293,572 A | 10/1981 | Silva et al. | |
| 4,504,502 A | 3/1985 | Earle et al. | |
| 4,504,509 A | 3/1985 | Bell et al. | |
| 4,510,166 A | 4/1985 | Lenchin et al. | |
| 4,520,034 A | 5/1985 | Ishii et al. | |
| 4,551,340 A | 11/1985 | El-Hag et al. | |
| 4,603,054 A | 7/1986 | Schmidt et al. | |
| 4,710,228 A | 12/1987 | Seaborne et al. | |
| 4,790,997 A | 12/1988 | Friedman et al. | |
| 4,792,458 A | 12/1988 | Friedman et al. | |
| 4,828,847 A | 5/1989 | Thompson | |
| 4,913,919 A | 4/1990 | Cornwell et al. | |
| 5,004,616 A | 4/1991 | Shanbhag et al. | |
| 5,035,912 A | 7/1991 | Furcsik et al. | |
| 5,059,435 A | 10/1991 | Sloan et al. | |
| 5,120,562 A | 6/1992 | Furcsik et al. | |
| 5,130,151 A | 7/1992 | Averbach | |
| 5,141,759 A | 8/1992 | Sloan et al. | |
| 5,204,137 A | 4/1993 | Slimak | |
| 5,254,353 A | 10/1993 | Huang et al. | |
| 5,260,076 A | 11/1993 | Furcsik et al. | |
| 5,302,410 A | 4/1994 | Calder et al. | |
| 5,393,552 A | 2/1995 | Busacker et al. | |
| 5,431,944 A | 7/1995 | Melvej | |
| 5,439,697 A | 8/1995 | Gonzalez-Sanz | |
| 5,484,617 A | 1/1996 | Tiffany | |
| 5,492,707 A | 2/1996 | Chalupa et al. | |
| 5,622,741 A | 4/1997 | Stubbs et al. | |
| 5,626,893 A | 5/1997 | Reddy | |
| 5,648,110 A | 7/1997 | Wu et al. | |
| 5,750,168 A | 5/1998 | Woerman et al. | |
| 5,753,286 A | 5/1998 | Higgins | |
| 5,849,351 A | 12/1998 | Higgins et al. | |

(Continued)

FOREIGN PATENT DOCUMENTS

| | | |
|---|---|---|
| CA | 2101474 | 7/1993 |
| WO | 8501188 | 3/1985 |

(Continued)

OTHER PUBLICATIONS

Food Product Design: Applications—"Keeping the Crunch in Breakfast Cereals" Jun. 2001.

(Continued)

*Primary Examiner* — Lien T Tran
(74) *Attorney, Agent, or Firm* — Price Heneveld LLP

(57) ABSTRACT

The disclosure describes new forms of chip-type and other fried or baked snack-type and/or convenience food items, including sweet goods such as cookies, doughnuts, etc., which are externally coated with or which directly incorporate into their dough matrix certain starch-based compositions. Methods of using the compositions to make the food products, and the finished food products themselves are described. As external coatings, the compositions significantly increase the crispness and tensile strength of the food item after it is cooked with the coating in place, and so change the organoleptic qualities as to provide a new form of the underlying food product. On sweet goods, the coating also provides a surface barrier that stabilizes sugar icing on the outside of the product, preventing it from becoming tacky, moist, or wet, while simultaneously reducing moisture loss from the dough, adding crispness at the surface and greatly retarding staling.

20 Claims, No Drawings

U.S. PATENT DOCUMENTS

| | | | |
|---|---|---|---|
| 5,885,639 A | 3/1999 | Judkins et al. |
| 5,897,898 A | 4/1999 | Rogols et al. |
| 5,922,392 A | 7/1999 | Kelly et al. |
| 5,928,693 A | 7/1999 | Friedman et al. |
| 5,965,189 A | 10/1999 | Stevens et al. |
| 5,976,607 A | 11/1999 | Higgins et al. |
| 5,988,048 A | 11/1999 | Hunter et al. |
| 5,997,918 A | 12/1999 | Melvej |
| 6,022,569 A | 2/2000 | Rogols et al. |
| 6,080,434 A | 6/2000 | Horn et al. |
| 6,086,928 A | 7/2000 | Stevens et al. |
| 6,113,957 A | 9/2000 | Mattinson et al. |
| 6,132,785 A | 10/2000 | Collinge et al. |
| 6,159,521 A | 12/2000 | Horn et al. |
| 6,197,363 B1 | 3/2001 | Walter, Jr. et al. |
| 6,217,921 B1 | 4/2001 | Lanner et al. |
| 6,265,005 B1 | 7/2001 | Haverkos et al. |
| 6,288,179 B1 | 9/2001 | Baur et al. |
| 6,635,294 B2 | 10/2003 | Keijbets |
| 6,733,809 B2 | 5/2004 | Zimmerman et al. |
| 6,896,915 B2 | 5/2005 | Shi et al. |
| 6,899,906 B2 | 5/2005 | Stevens et al. |
| 7,294,355 B2 | 11/2007 | Roskam et al. |
| 7,906,164 B2 | 3/2011 | Roskam et al. |
| 2002/0001643 A1 | 1/2002 | Stevens et al. |
| 2002/0058099 A1 | 5/2002 | Stevens et al. |
| 2002/0119219 A1 | 8/2002 | Doyle et al. |
| 2003/0044488 A1 | 3/2003 | Roskam et al. |
| 2004/0071832 A1 | 4/2004 | Stevens et al. |
| 2004/0071833 A1 | 4/2004 | Stevens |
| 2004/0096548 A1 | 5/2004 | Stevens et al. |
| 2004/0146630 A1 | 7/2004 | Roskam et al. |
| 2005/0079248 A1 | 4/2005 | Stevens et al. |
| 2005/0202136 A1 | 9/2005 | Stevens et al. |
| 2009/0098255 A1 | 4/2009 | Stevens |
| 2009/0098256 A1 | 4/2009 | Stevens et al. |

FOREIGN PATENT DOCUMENTS

| | | |
|---|---|---|
| WO | 9421143 | 9/1994 |
| WO | 9600011 | 1/1996 |
| WO | 9742827 | 11/1997 |
| WO | 9746106 | 12/1997 |
| WO | 0028828 | 5/2000 |
| WO | 0065932 | 11/2000 |
| WO | 0069287 | 11/2000 |
| WO | 0156393 | 8/2001 |

OTHER PUBLICATIONS

Igoe, Robert, Dictionary of Food Ingredients, Springer-Verlag, 2001, p. 83.

LrdRas.Flour-msg; flour as thickener, Sep. 4-5, 1998, p. 12. http://www.florilegium.org/files/FOOD-BREADS/flour-msg.html.

Prior Art French Fry Batter Formula.

84th AACC Annual Meeting Symposia and Reports, A. Jurgens, J.M. Maagd, and A.J. ten Dam, Oct. 31-Nov. 3, 1999.

Specialty-Corn Types, David V. Glover, Dept. of Agronomy, Purdue University, Oct. 1999.

Capolex B; Specialty Coatings for Snack Foods & Baked Goods, Centerchem, Inc., 1998.

Fennema, Owen (ed.), Food Chemistry Third Edition, Marcel Dekker, Inc. 1996, pp. 201-204.

PCT Written Opinion for International Application No. PCT/US02/18911, Jul. 22, 2003 (4 pages).

Search Report for PCT/US02/18911.

SNACK/CONVENIENCE FOODS AND THE LIKE HAVING EXTERNAL AND/OR INTERNAL COATING COMPOSITIONS

CROSS-REFERENCE TO RELATED APPLICATIONS

This application is a continuation of application Ser. No. 11/933,091, filed on Oct. 31, 2007, entitled SNACK/CONVENIENCE FOODS AND THE LIKE HAVING EXTERNAL AND/OR INTERNAL COATING COMPOSITIONS, now U.S. Pat. No. 7,906,164, the entire disclosure of which is hereby incorporated by reference in its entirety, which is a continuation of application Ser. No. 10/170,964, filed Jun. 13, 2002, entitled SNACK/CONVENIENCE FOODS AND THE LIKE HAVING EXTERNAL AND/OR INTERNAL COATING COMPOSITIONS, now U.S. Pat. No. 7,294,355, the entire disclosure of which is hereby incorporated by reference in its entirety, which claims priority to and the benefit of: Provisional Patent Application Ser. No. 60/305,005, filed Jul. 12, 2001 entitled WATER-DISPERSIBLE COATING COMPOSITION FOR SNACK FOODS AND THE LIKE AND FOOD PRODUCTS COATED THEREWITH the entire disclosure of which is hereby incorporated by reference, and Provisional Application Ser. No. 60/334,646, filed Nov. 30, 2001 entitled SNACK FOODS AND THE LIKE HAVING EXTERNAL AND/OR INTERNAL COATING COMPOSITIONS, the entire disclosure of which is hereby incorporated by reference.

FIELD OF THE INVENTION

In a broad sense, the present invention relates to the use of starch-based coating compositions on and in snack-type and other foods, but more particularly it relates to snack and other foods of many types, including potato-chips and various other such chip or snack-type foods, and more generally to other such supplemental or convenience-type foods, whether made from thinly sliced raw natural food substances such as potatoes etc., or from dough mixtures. In a first aspect, the invention relates to such foods where the coating is applied to the surface of the food substrate prior to cooking it (e.g., finish frying or baking), where it provides a substantially clear or color-enhancing appearance on such foods after cooking and substantially increases the crispness and tensile strength of at least the surface of such foods while maintaining or improving taste and appearance characteristics. In a second aspect, the invention relates to the novel use of such coating compositions by incorporating them into the dough of dough-based food products prior to baking them, where it has been surprisingly found that extremely favorable and similar results are also obtained.

BACKGROUND OF THE INVENTION

Processes and procedures for preparing and applying coatings to the outer surfaces of certain raw food substrates prior to freezing and finish cooking them, in particular potato products such as french fries, are generally known in the art and widely used. For example, starch-based coatings have been applied to cut, raw potato strips which are to be made into french fries, in an effort to obtain one or more of the following objectives: 1) improved visual appearance of the finished (cooked) product; 2) improved eating characteristics, especially surface crispness along with tender moist interiors, of the cooked product; and 3) extended holding time during which the finished product can be held under a heat lamp or the like while maintaining good post-preparation characteristics for consumption by a final consumer. These coatings are typically applied as a slurry or batter, and form a generally clear or at least minimally noticeable coat after they are dried on the substrates, especially after the coated substrates are parfried. Such "clear coats" are important because of their ability to at least partially maintain the natural appearance of the food substrate while imparting increased surface crispness and internal tenderness to it following final preparation. To this end, food coatings have been developed previously that were applied to sliced raw potato strips for french fries that were then at least briefly deep-fried and frozen for storage prior to finish cooking and consumption.

While used in the manufacture of french-fries from raw potato strips for many years, the concept of applying such coatings to the outer surfaces of thin, sheet-like slices of raw food substrates such as those used to make potato chips, or to dough-based snack or convenience food items such as bagel chips, and numerous other corn-based, wheat-based, rice-based, and oat-based snacks etc., and to baked goods such as doughnuts and other such "sweet goods" has never heretofore been either apprehended or attempted. Conventionally, raw potato chip slices are blanched and then dried prior to being fried or baked or otherwise cooked. After being dried and cooked, the chips (and other such "savory" snack products as well) are coated using a sprayed-on oil, and they are then passed through a rotating tumbler while introducing salt, coloring, flavoring, seasoning, and similar ingredients. Since this tumbling is done after the chips have been fried or baked (or otherwise cooked), it causes a significant amount (sometimes as much as 20-25%) of breakage into smaller, undesirable, and certainly less appealing pieces, since these types of snack food items are fragile and easily broken. Additional such breakage occurs during the packaging process, and again during subsequent handling, shipping, etc. This is very undesirable, since customers want to receive unbroken snack food items (potato and other chips, pretzels, crackers, etc.) when they purchase a product, not bits and pieces.

Currently, in the case of doughnuts, the only coating applied by the industry is merely a very sweet glaze coating, consisting mostly of sugar and/or chocolate ingredients, which is applied after baking. Due to their high levels of sugar, this type of coating has an extremely low water activity and is not in the same category as the water-dispersible batter or slurry starch-based coatings applied to french-fry potato strips, for example. In a basically complete departure from this, coatings for such conventional sweet goods in accordance with the present invention consist of less than 10%, and preferably less than 5%, sugar ingredients.

As noted above, the use of starch-based coatings on the strip-like cut raw potato substrates used to make french-fry potatoes has been known for some time. Through long experience, the industry has increasingly recognized that rice is an advantageous component to be used in these coating formulations. Rice provides added crispiness to the finish-cooked coated potato strip substrate. When used on cut, raw potato strips which are to become french-fries, the potato strips are typically first blanched, which includes immersing the cut, raw potato strips in a water bath for about 15 minutes at 180° F., and the blanched potato strips are then dipped into a 0.5% sodium chloride (2%) and sodium acid pyrophosphate (SAPP) and allowed to drip dry before placing them into a standard convection oven at 150° F. for 18 minutes to dry, but not be dehydrated. This drying reduces the moisture by about 12%.

Due to the inherent major size differences between the thin substrates used for potato chips and the thicker french-fry strips, as well as the differences between the nature of the finished products themselves, french-fry manufacturing processes are not utilized for potato chips, nor are they used for other snack foods. Thus, even in the case of potato chips, where thinly-sliced, raw potato substrates are used, there is no parfrying step involved, and there is also no freezing at all. Even greater differences exist in the case of other snack foods. For these and many other reasons, including the basic nature of the various products themselves, coating compositions such as are used for french fries have never been used or even considered for use in the snack and convenience food industry, so far as is known.

With reference to prior patents illustrating prior art coatings as referenced above, used primarily or exclusively for french-fried potato products that are frozen and reconstituted by gradient heating or microwave, U.S. Pat. No. 5,141,759 to Sloan et al., discloses a coating composition that contains cornstarch along with potato starch and rice flour in order to allegedly achieve a substantially clear and crisp potato coating having an extended holding time.

U.S. Pat. No. 5,965,189 to Stevens et al., describes a coated potato product having increased crispness and holding time through use of a coating having cornstarch in conjunction with corn flour and a low-solubility dextrin. This patent further claims that such coating composition is essentially non-allergenic.

U.S. Pat. No. 5,976,607, to Higgins et al. discloses the use of a substantial amount of modified cornstarch in a potato substrate coating to increase crispness of the final coated potato product, along with an amount of rice flour that serves to reduce or balance the crispness characteristic imparted through use of the modified cornstarch.

U.S. Pat. No. 5,997,918 to Melvej discloses a food coating composition for use on potatoes which contains a high percentage of cornstarch in relation to rice flour in order to obtain a coating composition which is said to impart increased crispness and holding time to the final cooked potato substrate product.

U.S. Pat. No. 5,095,435 to Sloan et al., discloses a process for preparing frozen coated potato products in which an aqueous starch slurry comprised of a combination of modified ungelatinized potato starch, modified ungelatinized corn starch, rice flour, and other optional ingredients, such as flavorings and seasonings, are utilized to allegedly improve the crispness of the final cooked coated potato product while maintaining the tenderness of the interior of the cut potato. The '435 patent also states that its disclosed coating, when placed upon a potato strip that is frozen, allows the potato product to be reconstituted within a conventional oven producing an acceptable product without decreased flavor characteristics.

SUMMARY OF THE INVENTION

The present invention apprehends for the first time the many advantages to be realized by using starch-based coating compositions on snack and other foods, including the fact that an appropriately formulated coating composition adds crispness to such food items, maintains or even enhances the food item's appearance, results in a significant increase in tensile strength, eliminates the need for the food item to be dried prior to coating (if the food item is blanched prior to cooking) and greatly retards staling, thereby greatly extending shelf life, while maintaining a wholesome and appealing product that continues to look and taste much like freshly made goods.

Furthermore, the invention includes apprehension of the fact that such starch-based coating compounds may very effectively be used on dough-based food products, including not only savory snack-type items such as are made from sheeted or expanded corn, wheat, and other such grain-based doughs (such as for example, fabricated chips or "crisps," cereals, various types of crumbs, etc.), and those made from thicker dough substrates such as "curls," puffs, etc., but also on sweet goods such as doughnuts, cookies, etc., and the like, and thereby obtain a substantial improvement in both appearance and eating characteristics, as well as greatly reducing breakage and staling of all such products.

The improved coated snack and other such food products may have increased crispness and tensile strength, uniformity of seasoning distribution, and they provide very desirable increases in economy from the standpoint of manufacturing, packaging, shipping, and handling. Significantly, no blanching of the thinly sliced raw food substrates used for chips is required prior to coating them in accordance with the present invention, as is the case for french-fry potato strips, which are thicker. Also, because the coating compositions of the present invention provide a seal over the surface of the food items, the coated food items have a significantly longer shelf life and require fewer preservatives than conventional snack food products. Therefore, the invention also provides the capability of substantially reducing packaging costs, since expensive moisture-resistant materials such as metal foils are no longer necessary.

In addition, it has been discovered that, quite surprisingly, these starch-type coating compounds or compositions may be added directly to (incorporated into the matrix of) dough-based food products before baking, frying, etc., and that this will also yield the same or similar kinds of advantages as when they are used as surface coatings. In this regard, most dough-based snack products have an open lattice dough structure, and will therefore incorporate other ingredients or compounds, such as the starch-based compounds of this invention, very well. When so augmented, these snack or other such food products obtain a very desirable and appealing inner crispness, while remaining tender and crunchy overall. Consequently, when the term "coating" is used herein, it is intended to refer to the compounds as used in either exterior or interior applications thereof.

Furthermore, it has been discovered that an even greater degree of such inner crispness may be achieved by adding a previously coated and baked particulate material, such as crumbs, to the dough mass before shaping and baking it, and an exterior coating of the slurry or batter may also be added to such composite food substrates before they are baked, to provide greater surface crispness. In some cases (as for example products made from dough, e.g., cookies), the partially or fully shaped product may be rolled or pressed into the coated particulate material to coat its surface and thus provide a crispy, crunchy exterior layer while maintaining a smooth, soft or otherwise-desired interior. This surface characteristic may be further enhanced by adding a liquefied coating (batter or slurry) atop the coated crumb layer on the outside, modifying parameters as necessary to obtain particular degrees of desired exterior crispness and crunchiness.

It is to be expressly noted that the increased and augmented interior and/or exterior crispness and tenderness provided in accordance with the invention produce snack, convenience and other types of food items which differ significantly in both texture and strength as well as in organoleptic qualities from the similar foods conventionally known, to the extent of comprising new and different, and very desirable types of such products.

These and other features, advantages, and objects of the present invention will be further understood and appreciated by those skilled in the art by reference to the following specification and claims.

DESCRIPTION OF THE PREFERRED EMBODIMENTS

Generally, the "coating" compounds or compositions of the present invention, when used as surface coatings, are in the form of a starch-based, wet batter. When incorporated directly into the dough matrix, substantially the same ingredients may be used but they may be introduced in dry form as well, adjusting the moisture content of the batter accordingly. Dent corn starch and modified corn starches may be used as the only starch ingredients, but the resultant snack or convenience food item, while having increased crispiness, will still be fragile. High-amylose corn starch may also be used as the only starch ingredient, and the use of such a coating results in a snack food item having increased crispiness and some increase in tensile strength; however, the resultant snack food item tends to have a chewy, less desirable mouth feel. When modified potato starch is used as the only starch ingredient (80-100%), the snack or convenience food item has greater crispiness than when corn starch is used, is not chewy, and has some increase in tensile strength. The increased tensile strength so achieved is similar to what may be achieved by use of high-amylose corn starch. While these starches may be used as the only starch components of the compounds, it has been discovered that three specifically different types of such compositions, utilizing various combinations of starch ingredients and other ingredients, are preferably used, depending on the nature of the food product involved. As discussed further hereinafter, one such type of composition appears to be better for potato and corn-based products, another for wheat, rice, and oat-based food types, and the third for sweet goods such as doughnuts and cake-type products. These particular forms of the compositions and those discussed or set forth elsewhere herein are all representative of and typify those intended to be embraced within the term "starch-based" coating composition as that term is used herein, which in their most basic aspect contain more starch than anything else, and often at least about fifty percent starch (which quantification or definition is also applicable to most or all other composite terms used herein which include the suffix term "-based").

In one particular example, the currently preferred general formulation for potato and corn-based snack/convenience foods includes the following ingredients:

| COMPONENT | RANGE (%/W) |
| --- | --- |
| Modified food starch (potato and/or corn) | 50-100 |
| Corn starch (preferably dent corn starch) | 10-30 |
| Dextrin | 4-20 |
| Salt | 0.1-15 |
| Stabilizer | 0.1-0.3 |
| Flow agent | 0.0-3 |

As can be seen from the ingredient ranges indicated above, the flow agent (e.g., tricalcium phosphate or silicon dioxide) can be omitted; however, the inclusion of some flow agent enhances the dry mix by keeping it from caking during storage. The corn starch component used is preferably made from unmodified dent corn, but modified corn starches may also be included or used in place of the unmodified dent corn. Modified food starches used in the present invention include modified corn or potato starches, including as well any pregelatinized starch, acid-modified starch, oxidized starch, enzymatically modified starch, crosslinked starch, acetylated starch, hydroxypropylated starch, or any combination thereof. Starches, in addition to being made from corn or potatoes, may be made from peas, triticale, tapioca, or waxy maize. Surprisingly, unlike prior art french-fry potato strip coatings, which favor the use of rice flour or starch to increase crispiness instead of corn or potato starch, Applicants have discovered that, while rice may be used, potato and/or corn starch have superior qualities when used to coat potato and corn-based snack-type foods, especially chip-type snacks (i.e., those which are only about on the order of about one-sixteenth inch thick). Applicants have also discovered that when potato and corn-based snack-type food items are being prepared, leavening is not necessary.

The currently preferred general formula which works best in conjunction with wheat, rice, and oat-based snack-type foods includes the following ingredients:

| COMPONENT | AMOUNT %/WT |
| --- | --- |
| Modified food starch (potato and/or corn) | 50-100 |
| Rice Flour | 10-30 |
| Dextrin | 4-20 |
| Salt | 0.1-15 |
| Leavening | 0.1-3 |
| Stabilizer | 0.1-0.3 |

The preferred formula for doughnut and cake-type product coatings includes essentially the same ones discussed above, depending on the ingredients used for the dough mixture in the particular doughnut or cake-type product; however, sugar or other sweeteners replace all salt in these coating formulas.

Significantly, Applicants observe that leavening and rice are not required in coatings used on or in potato and corn-based snack foods and the like, and that, in some instances, these may actually interfere with the ability of the coating to lay flat and be essentially invisible. This is counter to what conventionally is done when wet batter coatings are applied to the larger potato strips which are used for french fries and the like. Also, the use of a wet batter coating composition on sliced raw snack/convenience food product substrates (especially potato chips) eliminates the need for them to be dried before coating and further processing. This, of course, is a significant manufacturing benefit.

Regarding use of the invention on sweet goods, it has been discovered that the coating acts as a barrier between the dough and the sugar icing when the coating is applied and dried or fried onto the dough before the sugar icing stage, and this prevents moisture migration. The result is moist dough and dry or firm sugar icing during the hold period, enabling the product to appear as if it had just been made. Furthermore, addition of an emulsifier such as lecithin to the coating at about 1.25% significantly protects the product against the staling process because it has both a water-phobic and an oil-phobic side, and anchors itself polar to the cooked dough while repelling the moisture in the water-soluble sugar icing adjacent the surface. It has also been found that by increasing the doughnut coating formula's dextrin and/or rice flour levels in combination with addition of lecithin, doughnuts display exceptionally greater crispness than possible through prior art practices. The invention creates a crisp, brittle surface layer and either interior or exterior crunchiness as may be desired. The addition of an emulsifier such as lecithin is an important discovery and may be necessary to the successful use of any coating layer on a baked good that has an outer sugar coating applied. In this regard, it has been found that egg-related emulsifiers such as phospholipid products do not work well for this purpose, but that fatty acid-based emulsifiers such as those from soybean products and members of the lactylates class do have the very desirable effects just noted.

Typically, in using the invention in the form of a wet batter slurry for savory and salty snack foods, a minimum of about 32% to a maximum of about 48% dry ingredients in water is used, based on weight, preferably 39% to 42% dry ingredients in water. In the case of sweet goods such as doughnuts, a minimum of about 36% to a maximum of about 52% dry ingredients in water is used in the coating compositions, based on weight, preferably 42% to 46% dry ingredients in water. The wet batter slurry is applied to the product in ample amounts and the product picks up a certain amount of the slurry. As an example, in potato chips starting from fresh potato tuber slices, a minimum of about 10% to a maximum of about 30% of the wet batter slurry is picked up by the slices based on weight, preferably 16% to 22% wet batter slurry pick-up. In the case of fabricated potato chips and other sheeted-type products, a minimum of about 30% to a maximum of about 70% of the wet batter slurry is picked up by these types of products based on weights, preferably 45% to 55% wet batter slurry pick-up, because fabricated items tend to be more porous in nature than are raw slices from fresh potato tuber. The wet batter pick-up in the case of corn-based curls, puffs, and the like is similar to that of the fabricated chip-type items, for the same reason. In the case of granola bars and cookie-type items, a minimum of 10% to a maximum 25% to 35% wet batter slurry pick up is noted.

It should be understood that the coating compositions of the present invention may be used on innumerable kinds of snack or convenience type and other such food items including, but not limited to, potato chips and other such chips made from sliced raw or cooked vegetables or fruit, generally similar or analogous dough-based ("fabricated") products such as corn "chips" and/or other such crisps, including multigrain "chips," curls, puffs, and other such products including tortilla chips (corn and flour), taco shells, granola bars, party mixes consisting of rice, wheat, corn, etc., and cereals (corn, wheat, and flour-based), croutons, crackers, bagels and bagel chips, pretzel-type products, doughnuts, cake-type products, peanuts, walnuts, almonds, pecans etc. Many other such food items may also be coated externally with, or incorporate integrally in their matrix, the starch-based "coating" compositions of the present invention, with generally corresponding benefits. This also includes cookies (e.g., to make them crisp outside and maintain a soft, chewy, moist interior), muffins (adding crunch and a moisture barrier), pastries (including toaster pastries, pies and piecrust), breading material such as American bread crumbs, Japanese bread crumbs, cracker meal and other meals including corn meal, bread products including buns and rolls, biscuits, and numerous other such things including dehydrated potato, to add crunch and significantly reduce softening characteristics. This is very desirable, for example, when crumb products and/or dehydrated potato are then used as a coating to make a food product such as breaded fish or other seafood, chicken strips and the like, deep fried or baked cheese sticks, vegetable slices or pieces (such as zucchini), etc. When the food is a sliced raw fruit or vegetable, the coating composition may be applied to the sliced pieces while they are substantially in their natural state as cut without drying.

A further extension of this is a multiple or compound application of the coating compositions over the outside of a product already coated and dried, or coated with a coated crumb breading, for example, or a dough-based product which already has the coating compounds/compositions incorporated into its internal matrix or includes coated crumbs or the like mixed into the dough from which it is made. In this manner, interesting and novel degrees of added external and/or internal crispness may be obtained that are quite unique and desirable.

All of the aforementioned particular types of foods or food items, and others of which the aforementioned are generally representative, are intended to be included within and exemplify the term "snack or convenience-type" ("snack/convenience") foods and/or food substrates as that term is used herein and in the appended claims, which term basically and/or particularly applies to products having at least one surface (or a continuing, curved surface) of relatively large area, whose width or continuous surface extent is greater than the thickness of the product (although that may perhaps not be true in every case), expressly excluding the typical commercial french fry.

As indicated above, the invention includes the very novel and beneficial concept of using the coatings on crumb, flake, and shredded food products, including dehydrated potato. In the case of dehydrated potato, the wet slurry coating compositions create agglomerated potato clumps without previously agglomerating the dehydrated potato pieces, and the compositions may also be used on potato that has already been agglomerated by any of various methods already known, to thereby provide the various advantages and benefits described above. For example, by coating previously dehydrated potato that has been agglomerated with water and/or aqueous milk to increase the dehydrated potato's ability to disperse in water, the resulting agglomerate may be used as a topical coating for substrates without turning into a mushy mashed potato paste. The coated agglomerate, or agglomerates made with the coating slurry, allows for its use as a "breading" material for such products as chicken, fish, seafood, etc., and as noted above, the coating compositions may also be applied to the outside of such breaded items before cooking in order to obtain a desirable crispy or crunchy outer crust that enhances appearance as well as eating qualities of the breaded items.

Food items coated with and/or containing the compositions of the present invention result in a significantly crisper product, the degree and particular nature of which is achieved in a selective and controllable manner by use of various particular formulations of the compositions. When used as external (surface) coatings, the compositions are essentially invisible and provide a flat-laying coating on the chips or other surface, even for large-surface items such as food items. As a result, there is no visible appearance of the coating to the consumer.

Additionally, colorings, seasonings, particulates, spices, and the like may be easily incorporated into the compositions and this works especially well when they are used as exterior coatings. In fact, this has become preferred because, prior to the use of the coating composition of the present invention (as discussed above), snack-type food items have been coated with a sprayed-on oil and placed in a tumbler to be rotated along with the colorings, seasonings, particulates, spices and the like, in order to apply these to the surface of the snack food item. Use of the present coating composition to apply colorings, seasonings, spices and the like prior to cooking, as part of the wet batter, provides much more uniform and controlled distribution of these ingredients on the surface of the snack food items and eliminates the need for tumbling, which typically causes additional breakage. Thus, food items coated with the compositions of the present invention have a much more even dispersion of flavors, seasonings, colors, particulates and the like than is possible through prior art practices.

The fried or baked snack/convenience type food items coated in accordance with the present invention are crispier and have a much higher tensile strength than corresponding types of conventional uncoated snack food items. This is very desirable for many such foods, as the increased tensile strength and resulting crunchy texture are appealing, greatly reduce breakage and have other advantages as well; for example, in the case of cereals the products remain crunchy and do not wilt even after being immersed in milk for an extended time. The use of dextrins in the coating mixtures is of importance with respect to increased tensile strength; thus, where increased tensile strength is desirable, dextrin may be included and used at the higher ends of the approximate ranges indicated above. Where crispness is more important, and tensile strength less important, the dextrin component may be formulated at lower levels or even omitted altogether (as for example in the case of fried corn dough substrates such as "curls" or "puffs," which do not exhibit a great deal of breakage due to their thicker structure, but may benefit from increased surface crispness).

Where fragile substrates such as potato chips are involved, use of dextrin is beneficial to increase tensile strength as well as crispness. The increased tensile strength provided by the invention greatly enhances the ability of such fragile types of food to resist breakage during processing, packaging, transit, and during all steps until finally reaching the end purchaser. In this regard, the term "tensile strength" is used herein as it is generally used in the industry, meaning in essence the ability of the product to resist breakage, regardless of whether such breakage actually results from excessive tension forces in a strict engineering sense.

The coating compositions of the present invention may be applied to the food substrates as a slurry using any convenient means, but spraying works well (whether as a coarse, heavy spray or as a lighter spray or even as a mist, depending on the particular type of coating and substrate involved in a given situation), so as to coat the food substrates with the wet batter coating composition. Next, excess wet batter coating composition is blown off by air or allowed to drip off the food item, or otherwise removed, before subjecting the then-coated food substrate to a frying or baking step, etc. The coated food item is next fried or baked or otherwise cooked or processed further, at which time the coating dries and becomes affixed to the surface of the food item. The wet batter coating of the present invention may also be dried onto the surface of food substrates by such means as forced air (impingement), microwave, etc. Then, once cooked, the coated food pieces may be otherwise processed in any desired manner, packaged, and transported to the purchaser.

Additionally, while not preferred, the food items may be initially fried, baked, or otherwise cooked, or pre-cooked, to a desired extent and then the wet batter composition of the present invention may be applied and the food item further fried, baked, or otherwise cooked a second or successive time. However, the resultant snack or other such food item made in this manner typically has white, scaly, visible patches on the surface, which are not visually pleasing to consumers. The white, scaly patches may be removed by brushing or other means, making this process feasible, but certainly not preferred.

According to the present invention, snack and other such food items are either coated with a wet starch-based batter coating, as noted above, or have the composition included directly within their matrix (if they are made from a dough substrate). First the dry ingredients of the composition are mixed, and then water is added to form the desired wet batter. Then the wet batter's viscosity is measured and the food substrates coated (or have the composition added to their matrix and are formed with that supplemented matrix), and finally the coated or internally supplemented food item is cooked or further processed, typically by either frying or baking. Instead of using the composition as a wet batter in adding it directly to the matrix of dough-based snack or other such foods, the dry mix itself may be added to the dough as part of the dough matrix, with corresponding adjustment of the moisture content for the final product. The dough may be shaped into shapes such as curled pieces or twisted pieces. The dough may also be shaped by forming the dough into a sheet and subsequently dividing the sheet into smaller pieces. The sheet of dough may be divided into pieces either before or after it is cooked. When the dough is shaped into puffs, the dough is puffed using a pressurized gas.

A laboratory amount of wet batter is manufactured by the following process. First, about 420 g of dry batter mix is weighed into a small container. The dry batter mix contains the appropriate ingredients for a given snack food product as discussed previously. Next, about 580 g of water at 55° F. is poured into a 5 quart mixing bowl. Using a wire whip attachment to a blender, the water is stirred. The dry batter mix is slowly added to the mixing bowl over a period of one minute while stirring. Next, the stirring is momentarily stopped and any scattered contents are scraped down into a single pool of the mixture. The wet batter is then mixed at a higher speed for five more minutes. Finally, the wet batter is allowed to rest for 15 minutes.

The next step is to measure the viscosity of the wet batter. In order to measure the viscosity of the wet batter, one must measure the temperature of the wet batter after it has rested for 15 minutes. Next, a stein cup is filled to the top (nearly overflowing) with wet batter while holding a finger over the hole in the bottom. With a stopwatch in one hand and the stein cup in the other hand, the finger covering the hole in the bottom of the cup is released simultaneously with starting the stopwatch. The stopwatch is stopped once the stream of batter first breaks. The time should be recorded in seconds. Strain viscosity, depending on the desired results, should range from about four to about 20 seconds. The preferred viscosity is from about 9.5 seconds to about 10.5 seconds.

Next, the food item is either coated or has its dough matrix supplemented by inclusion of the coating mix (in either wet or dry form, with corresponding moisture adjustment of the dough). If coated, approximately 20 g of the food item is weighed out and measured. The food items are dropped into the mixing bowl of wet batter and immersed therein for about five seconds, or sprayed with the wet batter. The food items are then placed on a wire rack to drain. A forced air knife or other such air-moving apparatus is preferably used to remove excess batter from the food item.

The coated snack, convenience or other such food item should next be fried (i.e., deep fried) or baked or otherwise treated, to dry the coating onto the substrate surface shortly after, and preferably immediately after being coated with the wet batter. When fried, the coated food item is dropped into a fry basket and submerged in hot oil. A timer is started simultaneously with the food item being placed into the hot oil. The food item is preferably dropped into the hot oil from about two to three inches above the surface of the oil, with the basket submerged therein. The leftover wet batter from beneath the wire rack is added back into the mixing bowl so that another batch of food items can be coated. The preferred cooking time is from about one minute to three minutes when the food item is fried and from about three minutes to seven minutes when the food item is baked. Once the desired cooking time is achieved, in the case of frying, the fry basket is removed and the cooked snack food items are placed onto a paper towel to cool. Obviously, this procedure will have to be adjusted to industrial applications and for industrial amounts.

EXAMPLES

The following are examples of presently preferred formulas:

Formula 1—primarily used for potato and corn-based snack/convenience food items

| INGREDIENT | %/WT |
|---|---|
| Modified Food Starch (Modified food starch may be comprised of potato, corn, wheat, rice or tapioca; however, it is preferably comprised of potato and corn starch) | 80.58 |
| Dextrin | 4.90 |
| Corn Starch | 9.1 |
| Salt | 4.9 |
| Flow-agent (monocalcium phosphate) | 0.2 |
| Vegetable oil | 0.2 |
| Stabilizer (Xanthan gum) | 0.12 |

Formula—2 primarily doughnuts or other such sweet food items (cake, cookies, etc.)

| INGREDIENT | %/WT |
|---|---|
| Modified food starch | 53.02 |
| Wheat flour | 5.0 |
| Rice Flour | 18.33 |
| Leavening | 2.53 |
| Sugar | 11.0 |
| Dextrin | 10.0 |
| Stabilizer (Xanthan gum) | 0.15 |

Formula—3 primarily wheat, rice, and oat-based snack/convenience food items

| INGREDIENT | %/WT |
|---|---|
| Modified food starch | 63.82 |
| Rice Flour | 18.33 |
| Leavening | 1.7 |
| Salt | 6.0 |
| Dextrin | 10.0 |
| Stabilizer (Xanthan gum) | 0.15 |

Leavening that may be used in practicing the present invention includes monocalcium phosphate, sodium acid pyrophosphate, sodium bicarbonate, and other leavening compounds known to one of ordinary skill in the art. Leavening provides increased crispiness to the final food item, as do rice flour, wheat flour, and corn or potato starch.

As may be seen from the above examples and other comments set forth above, the starch ingredients predominate over others used in the various coating compositions, and that is basically what is meant by use of the term "starch-based" herein. That same principle applies to descriptions of food substrates such as "corn-based," etc.

It should be expressly noted that although sugar is referred to in the foregoing description, in connection with coatings or compositions for sweet goods, and in the examples of formulations set out above, other sweeteners may of course be used, e.g., corn syrup solids, invertase, etc. Accordingly, the specific term "sugar" as used herein should be understood as actually meaning "sweeteners," and includes any and all such other types of sweeteners (with appropriate amount adjustment in the formulas).

In another embodiment of the present invention, the food substrate may be in the form of a chip and the coating composition is free of rice flour and the second component consists of an unmodified, dent corn starch.

The above description is considered that of preferred embodiments only. Modification of these and other embodiments may occur to those skilled in the art and to those who make or use the invention. While the invention has principally been discussed in connection with snack and/or convenience type foods, etc., it is to be understood that this is for purposes of illustration only, and that the actual end use of the food (whether for snacking or otherwise) is not the important factor. Therefore, it is to be understood that the embodiments described above are merely for illustrative purposes and not intended to limit the scope of the invention, which is defined by the appended claims as interpreted according to the principles of patent law, including the Doctrine of Equivalents.

The invention claimed is:

1. A cooked food product comprising: a coating composition comprising:
   at least 53.02 weight percent of a first component consisting of at least one modified food starch selected from the group consisting of a modified potato starch and a modified corn starch wherein the modified food starch has been modified by a process chosen from the group consisting of pregelatinization, oxidation, enzymatic modification, cross-linking, acetylation, hydroxypropylation or any combination thereof;
   from 10 to 30 weight percent of an unmodified corn starch; and
   from 4 to 20 weight percent dextrin; and wherein all amounts are based upon weight percent of the dry components; and
   a snack/convenience-type food substrate chosen from the group consisting of: chips made from an undried sliced vegetable or fruit having a thickness of about one-sixteenth inch; a curl; a puff; a tortilla chip; a taco shell; a granola product; a crouton; a cracker; a bagel chip; a pretzel; a doughnut; a cake; a cookie; a muffin; a pastry; a breading material; a bread; a biscuit; a pie crust; a bagel; and a preformed agglomerate containing a dehydrated potato substrate formed by combining water or milk and the dehydrated potato substrate; and
   wherein the coating composition is applied to a surface of the food substrate prior to cooking the food substrate and cooked in place along with the substrate to form the cooked food product wherein the coating composition is not visible to a consumer of the cooked food product.

2. A cooked food product comprising a snack/convenience-type food substrate chosen from the group consisting of: chips made from an undried sliced vegetable or fruit, having a thickness of about one-sixteenth inch; a curl; a puff; a tortilla chip; a taco shell; a crouton; a cracker; a bagel chip; a pretzel; a doughnut; a muffin; a pastry; and a biscuit and a coating composition applied to the substrate prior to cooking the substrate that is cooked in place along with the substrate to form the cooked food product, and wherein the coating composition formed on the substrate is not visible to a consumer of the cooked food product, and wherein the coating composition comprises:

at least 53.02 weight percent of a first component consisting of at least one modified food starch selected from the group consisting of a modified potato starch and a modified corn starch wherein the modified food starch has been modified by a process chosen from the group consisting of pregelatinization, oxidation, enzymatic modification, cross-linking, acetylation, hydroxypropylation or any combination thereof;

from 10 to 30 weight percent of an unmodified corn starch; and from 4 to 20 weight percent dextrin; and wherein all amounts are based upon weight percent of the dry components.

3. A cooked food product comprising a snack/convenience-type food substrate chosen from the group consisting of: chips made from an undried sliced fruit, having a thickness of about one-sixteenth inch; a corn dough curl; a corn dough puff; a tortilla chip; a taco shell; a crouton; a cracker; a bagel chip; a pretzel; a doughnut; a cake; a cookie; a muffin; a pastry; a bread; a biscuit; a pie crust; and a bagel and a coating composition applied to the substrate prior to cooking the substrate that is cooked in place along with the substrate to form the cooked food product, and wherein the coating composition formed on the substrate is not visible to a consumer of the cooked food product after cooking the substrate and the coating composition, and wherein the coating composition comprises:

at least 53.02 weight percent of a first component consisting of at least one modified food starch selected from the group consisting of a modified potato starch and a modified corn starch wherein the modified food starch has been modified by a process chosen from the group consisting of pregelatinization, oxidation, enzymatic modification, cross-linking, acetylation, hydroxypropylation or any combination thereof;

from 10 to 30 weight percent of an unmodified corn starch;

from 4 to 20 weight percent dextrin; and wherein all amounts are based upon weight percent of the dry components; and wherein the cooked food product is baked.

4. The cooked food product of claim 1, wherein the snack/convenience food substrate has an external surface and the coating composition is applied to the external surface of the food substrate and provides a flat-laying coating on the external surface of the food substrate.

5. The cooked food product of claim 4, wherein the coating composition is substantially clear coating on the cooked food product after cooking.

6. The cooked food product of claim 2, wherein the snack/convenience food substrate has an external surface and the coating composition is applied to the external surface of the food substrate and provides a flat-laying coating on the external surface of the food substrate.

7. The cooked food product of claim 6, wherein the coating composition is substantially clear coating on the cooked food product after cooking.

8. The cooked food product of claim 3, wherein the snack/convenience food substrate has an external surface and the coating composition is applied to the external surface of the food substrate and provides a flat-laying coating on the external surface of the food substrate.

9. The cooked food product of claim 8, wherein the coating composition is substantially clear coating on the cooked food product after cooking.

10. The cooked food product of claim 1, wherein the coating composition comprises a batter or slurry when applied to the substrate, wherein the first component consists of a modified potato starch and the modified potato starch comprises at least 80 weight percent of the coating composition and modified potato starch is the only starch ingredient in the coating composition.

11. The cooked food product of claim 10, wherein the food substrate is in the form of a chip and the unmodified corn starch is an unmodified, dent corn starch.

12. The cooked food product of claim 2, wherein the snack/convenience food substrate has an external surface and the coating composition is applied to the external surface of the food substrate and provides a flat-laying coating on the external surface of the food substrate; and wherein the coating composition comprises a batter or slurry when applied to the substrate, wherein the first component consists of a modified potato starch and the modified potato starch comprises at least 80 weight percent of the coating composition and modified potato starch is the only starch ingredient in the coating composition.

13. The cooked food product of claim 1, wherein the food substrate is in the form of a chip the coating composition is substantially clear coating on the cooked food product after cooking and the unmodified corn starch is an unmodified, dent corn starch.

14. The cooked food product of claim 3, wherein the snack/convenience food substrate has an external surface and the coating composition is applied to the external surface of the food substrate and provides a flat-laying coating on the external surface of the food substrate; and the coating composition comprises a batter or slurry when applied to the substrate, wherein the first component consists of a modified potato starch and the modified potato starch comprises at least 80 weight percent of the coating composition.

15. The cooked food product of claim 14, wherein the food substrate is in the form of a chip and the coating composition is substantially clear coating on the cooked food product after cooking and the unmodified corn starch is an unmodified, dent corn starch.

16. The product made by the method of claim 1, wherein the coating composition comprises: 60 to 65 weight percent first component; leavening in an amount of less than 5 weight percent; 5 to 10 weight percent salt; 10 weight percent dextrin; and a stabilizer in an amount of less than 1 weight percent; and wherein all weight percentages are based upon the weight of the dry ingredients.

17. The cooked food product of claim 1, wherein the snack/convenience-type food substrate is chosen from the group consisting of a tortilla chip and a taco shell and wherein the first component consists of a modified potato starch and the modified potato starch comprises at least 80 weight percent of the coating composition and modified potato starch is the only starch ingredient in the coating composition.

18. The cooked food product of claim 1, wherein the first component consists of a modified potato starch and the modified potato starch comprises at least 80 weight percent of the coating composition and modified potato starch is the only starch ingredient in the coating composition.

19. The cooked food product of claim 1, wherein the coating composition is substantially clear coating on the cooked food product after cooking and the cooked food product is baked or fried.

20. The cooked food product of claim 19, wherein the cooked food product is baked.

* * * * *